(12) United States Patent
Stevenson (10) Patent No.: US 7,827,164 B2
(45) Date of Patent: Nov. 2, 2010

(54) SYSTEM FOR OBTAINING, MANAGING AND PROVIDING RETRIEVED CONTENT AND A SYSTEM THEREOF

(75) Inventor: Linda M. Stevenson, Rochester, NY (US)

(73) Assignee: LucidityWorks, LLC, W. Henrietta, NY (US)

( * ) Notice: Subject to any disclaimer, the term of this patent is extended or adjusted under 35 U.S.C. 154(b) by 372 days.

(21) Appl. No.: 10/988,342

(22) Filed: Nov. 12, 2004

(65) Prior Publication Data
US 2005/0216449 A1 Sep. 29, 2005

Related U.S. Application Data

(60) Provisional application No. 60/519,279, filed on Nov. 13, 2003.

(51) Int. Cl.
*G06F 17/30* (2006.01)
(52) U.S. Cl. ........................ 707/708; 707/728
(58) Field of Classification Search ........................ None
See application file for complete search history.

(56) References Cited

U.S. PATENT DOCUMENTS

| | | | | |
|---|---|---|---|---|
| 5,815,830 | A * | 9/1998 | Anthony | 707/6 |
| 6,236,987 | B1 * | 5/2001 | Horowitz et al. | 707/3 |
| 6,385,611 | B1 | 5/2002 | Cardona | |
| 6,397,231 | B1 | 5/2002 | Salisbury et al. | |
| 6,507,841 | B2 | 1/2003 | Riverieulx de Varax | |
| 6,510,434 | B1 | 1/2003 | Anderson et al. | |
| 6,513,033 | B1 | 1/2003 | Trauring | |
| 6,535,875 | B2 | 3/2003 | Takahashi et al. | |
| 6,582,474 | B2 | 6/2003 | LaMarca et al. | |
| 6,584,459 | B1 | 6/2003 | Chang et al. | |
| 6,594,654 | B1 | 7/2003 | Salam et al. | |
| 6,598,047 | B1 | 7/2003 | Russell et al. | |
| 6,631,373 | B1 | 10/2003 | Otani et al. | |
| 6,678,694 | B1 | 1/2004 | Zimmermann et al. | |
| 6,694,307 | B2 | 2/2004 | Julien | |
| 6,823,331 | B1 * | 11/2004 | Abu-Hakima | 707/3 |
| 6,983,288 | B1 * | 1/2006 | Kirkwood et al. | 707/103 R |
| 7,152,064 | B2 * | 12/2006 | Bourdoncle et al. | 707/5 |
| 2001/0049675 | A1 | 12/2001 | Mandler et al. | |
| 2001/0053968 | A1 * | 12/2001 | Galitsky et al. | 704/9 |
| 2002/0023077 | A1 | 2/2002 | Nguyen et al. | |
| 2003/0018626 | A1 * | 1/2003 | Kay et al. | 707/3 |

(Continued)

OTHER PUBLICATIONS

Mark Logic Corporation, "Unlocking the Value of Your Enterprise Content," *An Information Week*, Vendor Perspectives, Slides 1-28 (2004).

(Continued)

*Primary Examiner*—Neveen Abel Jalil
*Assistant Examiner*—Son T Hoang
(74) *Attorney, Agent, or Firm*—Simpson & Simpson, PLLC (57) ABSTRACT

A method, computer readable medium with programmed instructions, and system for obtaining, managing, and providing retrieved content includes selecting one or more concepts from a plurality of concepts. One or more chunks of content are associated with each of the concepts. At least one search parameter is provided and the one or more chunks associated with each of the selected concepts are searched using the at least one search parameter. The one or more chunks which match the selected concepts and the at least one search parameter are presented.

16 Claims, 6 Drawing Sheets

U.S. PATENT DOCUMENTS

2004/0083203 A1* 4/2004 Kemp .......................... 707/3
2004/0103105 A1 5/2004 Lindblad et al.
2004/0225667 A1* 11/2004 Hu et al. ..................... 707/100
2004/0254916 A1* 12/2004 Dettinger et al. ............... 707/3

OTHER PUBLICATIONS

Van Zuylen, "From Documents to Information: A New Model for Information Retrieval," *Inxight Software, Inc.* pp. 1-18 (2004).

Mark Logic Corporation, "Developer's Guide," *Mark Logic Content Interaction Server*, Version 2.2, pp. 1-112 (2004).

Mark Logic Corporation, "Getting Started with Content Interaction Server," *Mark Logic Content Interaction Server*, Version 2.2, pp. 1-17 (2004).

Mark Logic Corporation, "Developer's Guide," *MarkLogic Server*, Release 3.0, pp. 1-128 (2005).

Teragram Corporation, "Teragram Categorizer™," (Copyright ©) at http://www.teragram.com/solutions/categorizer.htm?referrer=google (visited Feb. 24, 2004).

Maio, "Taxonomy Software to the Rescue," Posted on Oct. 12, 2001 on the Online Journal Review® (Copyright©) at http://www.ojr.org/ojr/technology/1015016550.php (visited Feb. 24, 2004).

* cited by examiner

Google Search: strategy Paychex OR Administaff OR Ceridian "financial information " Page 1 of 11

Web Images Groups News Froogle more » strategy Paychex OR Administaff OR Ceridian [ Search ]  Advanced Search
Preferences

Web Results 1 - 100 of about 637 for strategy Paychex OR Administaff OR Ceridian "financial Information

Forbes.com: Paychex. Inc. Schedules Webcast of the 2004 Annual ...
... news releases, current financial Information, related SEC
filings, and ... 00:00 AM ET Paychex founder Golisano ...
www.forbes.com/businesswire/feeds/businesswire/ 2004/09/22/businesswire20040922005055r1.html - 100k -
Cached - Similar pages Paychex Honored With 2002 Training Top 100 Award
... investor presentation, and other financial Information on this Web ... "Paychex has embraced
training and workforce ... as a mission-critical strategy, and accordingly ...
www.paychex.com/news/02/022802.html - 17k - Cached - Similar pages Paychex Career Opportunities - Payroll Invoice Resolution ...
   ... Providing customer service to Paychex clients, branches ... updated demographic and **financial
   Information on each ... Recommending the best strategy** possible based on ...
   www.paychex.com/careers/finance/payrollcollectspec.html - 16k - Cached - Similar pages
   [ More results from www.paychex.com ]

Administaff Investor Relations
... ability to effectively implement its eBusiness strategy; (vi) the ... Administaff, Inc.
Summary Financial Information (in thousands, except per share amounts and ...
www.corporate-ir.net/ireye/ir_site.zhtml?ticker=ASF& script=410&layout=-6&item_id=391881 - 30k -
Cached - Similar pages D&B Investor Relations
   ... most recently senior vice president of D&B with responsibility for strategy
   implementation, marketing ... a member of the board of directors of Administaff Inc., ...
   www.corporate-ir.net/ireye/ir_site.zhtml?ticker=DNB& script=410&layout=9&item_id=298427 - 21k -
   Cached - Similar pages CBS MarketWatch - Business News - Financial Information ...
... Bush rips Kerry President accuses challenger of an Iraq "strategy of defeat." Pocketbook
predictor Economy.com model says states' conditions point to a Bush win ...
cbs.marketwatch.com/news/default.asp?siteID=krd_ksc - 101k - Cached - Similar pages CBS MarketWatch - Business News - Financial Information ...
   ... Movers & Shakers Henry Schein, Actuate, Paychex, Medtronic, Big Lots, more.
   Wolverine: Top gainer on NYSE And: Global markets roundup. ...
   cbs.marketwatch.com/news/default. asp?siteid=krd_ksc&dist=Inctab - 101k -
   Cached - Similar pages Financial Reporting and Analysis Software - Information Builders
... Administaff achieves significant savings with WebFOCUS ... under more pressure than ever
before to guarantee the accuracy of the financial Information they provide ...
www.informationbuilders.com/ products/webfocus/financial_reporting.html - 38k - Cached - Similar pages Function-Specific Customer Success Stories
   ... Delivers Financial Information in a Manner Useful to Nonfinancial ... Technology to Roll
   Out mySAP™ Business Intelligence Strategy. ... Administaff Expands Online ...
   www.informationbuilders.com/ applications/sol_by_function.html - 101k - Oct 13, 2004 -

*Lucidity" - Transforming Data into a Strategic Resource*

Research Request

Welcome! Please enter at least one search term and one keyword.

1. Choose date range.
   Format 00/00/0000
   Date: 01/01/03
   Date: 09/30/03

This is a KEYWORD shown on the Search Results page. This word MUST BE IN THE CONTENT/DOCUMENT 2. Enter search term(s). Paychex 3. Select keyword(s) in report format order.

| 1. | 2. | 3. | 4. |
   |---|---|---|---|
   | Macro Environment | None selected | Financials | Personnel |
   | Personnel | Channels | Forecast | Prices |
   | Prices | Competition | Market Share | Products |
   | Products | Financials | Macro Environment | Services |

| 5. | 6. | 7. | 8. |
   |---|---|---|---|
   | Macro Environment | None selected | None selected | None selected |
   | Personnel | Channels | Channels | Channels |
   | Prices | Competition | Competition | Competition |
   | Products | Financials | Financials | Financials |

| 9. | 10. | 11. | 12. |
   |---|---|---|---|
   | None selected | None selected | None selected | None selected |
   | Channels | Channels | Channels | Channels |
   | Competition | Competition | Competition | Competition |
   | Financials | Financials | Financials | Financials |

These are CONCEPT terms. They do NOT need to be in the content - but their synonyms are. The Search Results screen returns results in the order selected on this screen. Multiple "chunks" can be assigned to a concept.

4. Select file types. Use CTRL key for multiple selections. All types is the default.
   All types
   Audiovisuals
   Databases 5. Select report format.
   ● Keyword 1
     Keyword 2
     Keyword 3
     ↓
     Keyword 12

○ Keyword 1
     Keyword 2
     Keyword 3
     ↓
     Keyword 12

[Submit] [Save] [Cancel] [Exit]

FIG. 5

Lucidity™ - Transforming Data into a Strategic Resource

Paychex, Inc.

Paychex is one of a few company names entered in the search box. Macro environment, Financials, Forecast, Services, and Personnel are the key concepts. The italicized excerpts come from the actual content.

Macro Environnent
*The View From Europe - Down, But By No Means Out*

*Last year's out-performance of UK and Continental European HCS stocks has now dissipated. The majority of stocks that peaked in the beginning of the year have since fallen back by roughly 25%. The old adage that it is always better to travel than to arrive clearly comes to mind in this instance. Whereas prices in 2003 were driven by the anticipation of better conditions in 2004, now that companies have (for the most part) successfully arrived at this eagerly anticipated state, institutional appetite for HCS companies has waned. This is somewhat understandable given the considerable gains achieved last year. However, we believe the party is far from over.*

Human Capital Services Equity Research  
Baird Research  Research  Randell A. Mehl et al  6/30/2004  
www.rwbaird.com/docs/yourreports/vieweurope.pdf > Just the "chunk" you requested

Financials

> In the order you requested

| Balance Sheet<br>All amounts in US $M | May 04<br>(Prelim.) | May 03 | May 02 |
|---|---|---|---|
| Assets | | | |
| Current Assets | | | |
| Cash | – | 79.9 | 61.9 |
| Net Receivables | – | 141.3 | 135.2 |
| Inventories | – | 0 | 0 |
| Other Current Assets | – | 2,811.40 | 2,617.50 |
| Total Current Assets | – | 3,032.60 | 2,814.60 |
| Net Fixed Assets | – | 159 | 121.6 |
| Other Non current Assets | – | 499.1 | 16.9 |
| Total Assets | – | 3,690.80 | 2,953.10 |

2004 Financials  Hoovers  
Hoovers Web site  5/31/2004  
http://premium.hoovers.com/subscribe/co/fin/annual.xhtml?COID=14388

Forecast

*The Bureau of Labor Statistics expects 27,788 new human resources jobs to be created between 2000 and 2010, and has identified the computer and data processing services as the largest area of growth. While human resource jobs are expected to grow by only 12.7 percent (lower than the average for jobs overall), HR jobs in the computer industry are expected to grow by an impressive 66 percent.*

Industry Overview  Wetfeet.com  
http://www.net-temps.com/jobs/humanresource/wetfeet.htm?index=0  2003

Services

*Paychex also makes sure to offer clients its higher-margin personnel services like processing 401(k) plans, tax filing and workers' compensation. William Blair analyst David Farina estimates that 65% or more of incremental revenue from added services beyond payroll drops straight to the company's operating profits*

Business Services & Supplies  Allison Fass  
http://www.forbes.com/free_forbes/2004/0112/150a.html  01/12/04

Personnel

Tom Golisano picture

> 200+ file types. Not just documents

> Complete with full bibliographic citations and a link to the complete content

Paychex 2003 Annual Report  Paychex  
Paychex  Annual reports  5/31/2003  
www.paychex.com/investors/annuals/2003annual.pdf

FIG. 6

SYSTEM FOR OBTAINING, MANAGING AND PROVIDING RETRIEVED CONTENT AND A SYSTEM THEREOF

The present invention claims the benefit of U.S. Provisional Patent Application Ser. No. 60/519,279, filed Nov. 13, 2003, which is hereby incorporated by reference in its entirety.

FIELD OF THE INVENTION

This invention generally relates to systems and methods for managing data and, more particularly, a system for obtaining and managing retrieved content and a system thereof.

BACKGROUND

The amount of information from sources, such as from the Internet, continue to grow at a rapid pace. This rapidly growing volume of information provides a valuable resource for analysts searching for information on a particular topic. Unfortunately, when this large volume of information is searched, the resulting information is not provided in any manner which is easy to synthesize.

Figure 1:
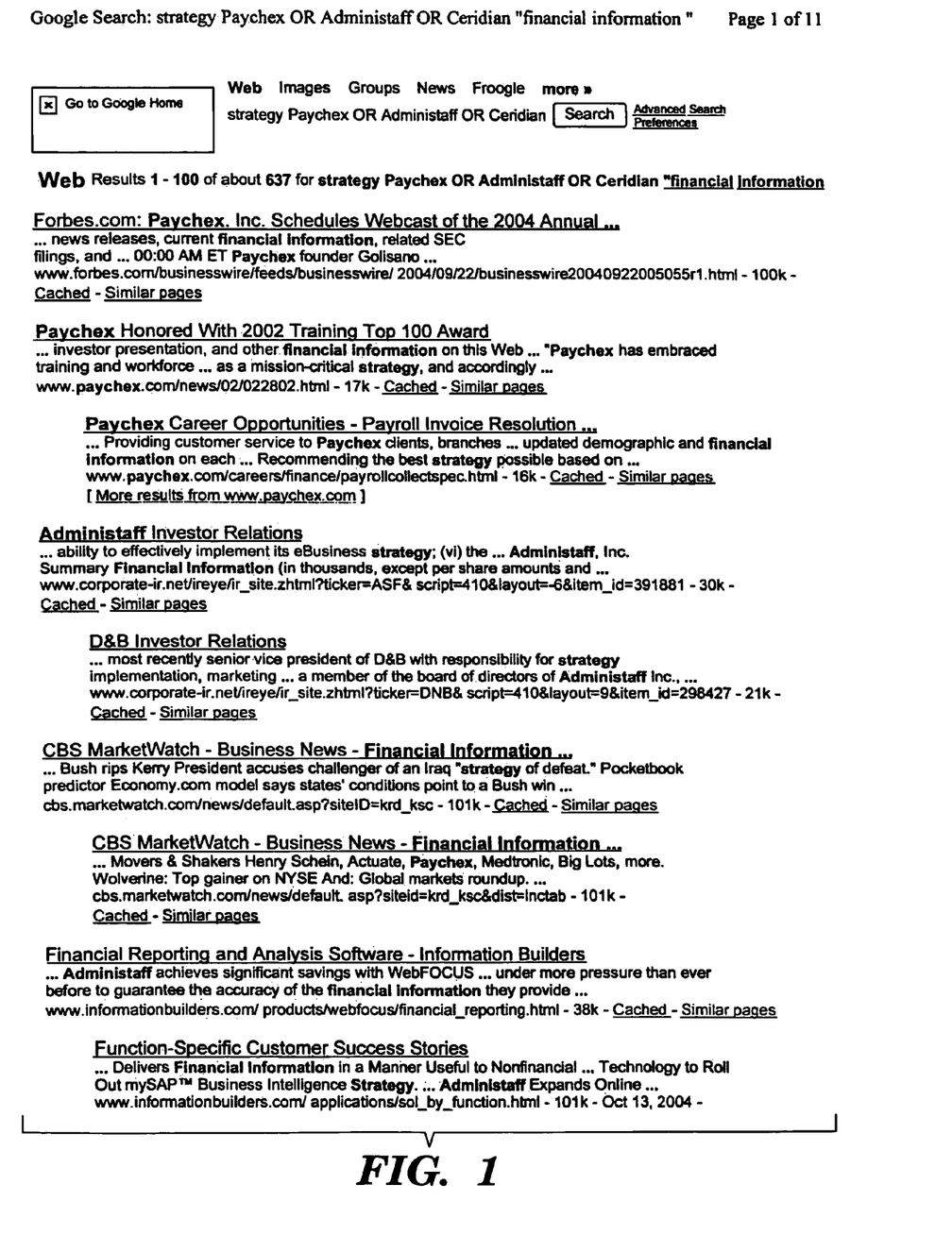
FIG. 1 is a screen shot of results of a prior art search.

By way of example, a screen shot of the results of a search using a typical Internet search engine and using the search terms, "strategy Paychex or Administaff or Ceridian" is illustrated in FIG. 1. As this screenshot illustrates, the information is not provided in any organized and easily synthesized manner for the analyst. Typically, the analyst will need to review each of the items in the search results to determine which are of interest and for what aspect of the research. Although this method of research works, it is clearly very time consuming.

SUMMARY

A method and a computer readable medium with programmed instructions for obtaining, managing, and providing retrieved content in accordance with embodiments of the present invention includes selecting one or more concepts from a plurality of concepts. One or more chunks of content are associated with each of the concepts. At least one search parameter is provided and the one or more chunks associated with each of the selected concepts are searched using the at least one search parameter. The one or more chunks which match the selected concepts and the at least one search parameter are presented.

A system for obtaining, managing, and providing retrieved content in accordance with embodiments of the present invention includes a selection processing system, a search system, and a display system. The selection processing system selects one or more concepts from a plurality of concepts. One or more chunks of content are associated with each of the concepts. The search system searches the one or more chunks associated with each of the selected concepts using at least one search parameter. The display system presents the one or more chunks which match the selected concepts and the at least one search parameter.

The present invention provides a number of advantages including providing a more effective system and method for obtaining, managing, and providing retrieved content. The present invention enables all content, regardless of platform, vendor, or location, to be easily accessed and managed. Additionally, the present invention not only searches the obtained content based on the selected concepts, but also based on one or more related concepts for each of the selected concepts to identify a more comprehensive range of relevant chunks. The present invention also searches the chunks associated with the selected concepts not only using the search parameters, but also using one or more related parameters for each of the selected concepts which results in a more comprehensive search result.

The present invention also provides a dynamic, real-time, end-user designed report of the search results. The retrieved content is more easily synthesized by the operator or analyst because the retrieved content is presented under the heading of the selected concept and the selected concepts are presented in the order in which the concepts were selected. Further, the present invention provides bibliographic information with each retrieved chunk of information so that a user can easily identify the source of the content. The retrieved chunks also include a link so that the researcher can easily retrieve and review the entire content related to the retrieved chunk when desired.

DETAILED DESCRIPTION

Figure 2:
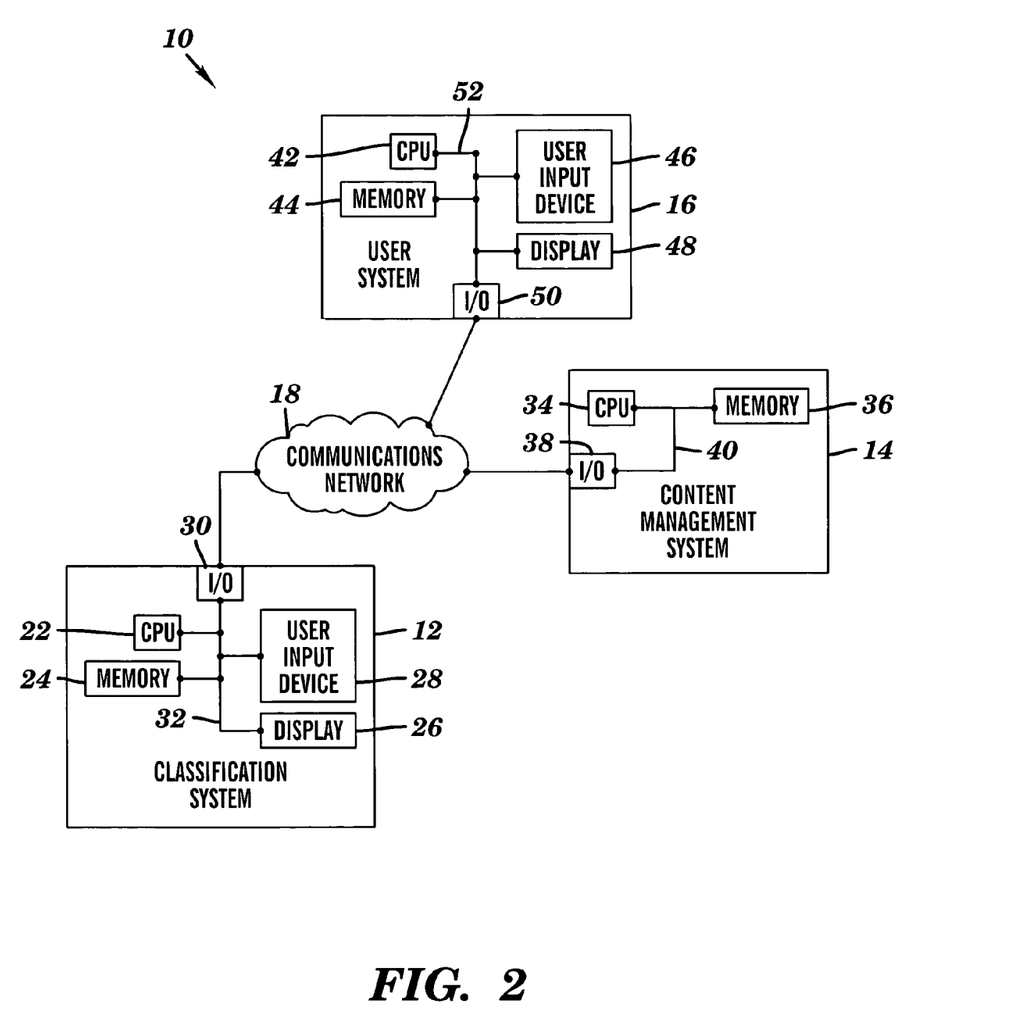
FIG. 2 is a block diagram of a system for obtaining, managing, and providing retrieved content in accordance with embodiments of the present invention.

A system 10 for obtaining, managing, and providing retrieved content in accordance with embodiments of the present invention is illustrated in FIG. 2. The system 10 includes a classification system 12, a content management system 14, a user system 16 and a communications network 18, although the system 10 can include other types and numbers of components arranged in other manners. The present invention provides a number of advantages including providing a more effective system and method for obtaining, managing, and providing retrieved content.

Referring more specifically to FIG. 2, the classification system 12 is used to review obtained content from a variety of different sources, identify chunks or portions of the obtained content that are relevant to one or more concepts or topics, and store the identified chunks of the content with bibliographic information and a link back to the original content, although the classification system 12 can have other functions and other types and numbers of systems can be used for the classification system 12. Although one classification system 12 is shown, the system 10 can have other numbers and types of classification systems.

In these embodiments, the classification system 12 includes a central processing unit (CPU) or processor 22, a memory 24, a user input device, a display 26, user input device 28, and an input/output interface system 30 which are coupled together by a bus or other link 32, although other numbers and types of components in other configurations can be used. The processor 22 in the classification system 12 executes a program of stored instructions for one or more aspects of the present invention as described herein, including one or more aspects of the method for obtaining, managing, and providing retrieved content as described with reference to FIGS. 3 and 4. The memory 24 stores these programmed instructions for one or more aspects of the present invention as described herein, although some or all of the programmed instructions could be stored and/or executed elsewhere, such as in a memory by a processor in content management system 14. A variety of different types of memory storage devices, such as one or more databases, random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory 24 and the memory storage device could be at a separate location from the classification system 12. The user input device 28 enables an operator to generate and transmit signals or commands to the processor 22, such as information on how to break obtained content into chunks. A variety of different types of user input devices could be used for user input device 28, such as a keyboard or computer mouse. The display device 26 displays information for the operator, such as the obtained content. A variety of different types of display devices can be used for display device 26, such as a CRT display. The input/output interface system 30 is used to operatively couple and communicate between the classification systems 12 and other devices and systems, such as the content management system 14.

The content management system 14 is used to search the stored chunks associated with the selected concepts using the entered search parameters and to provide the results to the user system 16, although the content management system 14 can have other functions and other types and numbers of systems can be used for the content management system 14.

In these embodiments, the content management system 14 includes a central processing unit (CPU) or processor 34, a memory 36, and an input/output interface system 38 which are coupled together by a bus or other link 40, although other numbers and types of components in other configurations can be used. The processor 34 in the content management system 14 executes a program of stored instructions for one or more aspects of the present invention as described herein, including one or more aspects of the method for obtaining, managing, and providing retrieved content as described with reference to FIGS. 3 and 4. The memory 36 stores these programmed instructions for one or more aspects of the present invention as described herein, although some or all of the programmed instructions could be stored and/or executed elsewhere, such as in the memory of classification system 12. The memory 36 also stores tables with related terms which are similar or analogous to entered search terms, although related parameters to entered search parameters can be stored in other locations and could be obtained in other manners. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory 36. The input/output interface system 38 is used to operatively couple and communicate between the content management system 14 and other devices and systems, such as the classification system 12 and the user system 16.

The user system 16 is used by the analyst to conduct searches including selecting concepts, entering other search parameters, and reviewing the results of the search in a customized report, although the user system 16 can have other functions and other types and number of systems can be used for the user system 16. Although one user system 16 is shown, the system 10 can have other numbers and types of user systems.

In these embodiments, the user system 16 includes a central processing unit (CPU) or processor 42, a memory 44, a user input device 46, a display 48, and an input/output interface system 50 which are coupled together by a bus or other link 52, although other numbers and types of components in other configurations can be used. The processor 42 in the user system 16 executes a program of stored instructions for one or more aspects of the present invention as described herein, including one or more aspects of the method for obtaining, managing, and providing as described with reference to FIGS. 3 and 4. The memory 44 stores these programmed instructions for one or more aspects of the present invention as described herein, although some or all of the programmed instructions could be stored and/or executed elsewhere, such as in the memory by the processor in content management system 14. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory 44. The user input device 46 enables an operator to generate and transmit signals or commands to the processor, such as selecting the concepts and entering the search parameters. A variety of different types of user input devices could be used for user input device 46, such as a keyboard or computer mouse. The display device 48 displays information for the operator, such as the screen shots illustrated in FIGS. 5 and 6. A variety of different types of display devices can be used for display device 48, such as a CRT display. The input/output interface system 50 is used to operatively couple and communicate between the user system 16 and other devices and systems, such as the content management system 14 and the classification system 12.

The communication network 18 is the world wide web, although other types of communication systems and/or methods can be used for the communication network 18 to operatively couple and communicate between the classification system 12, content management system 14, and the user system 16. By way of example, the communication network 18 could comprise a direct connection, a local area network, a wide area network, modems and phone lines, and wireless communication technology each having their own communications protocols and different types of communication networks could be used between the different systems.

Figure 3:
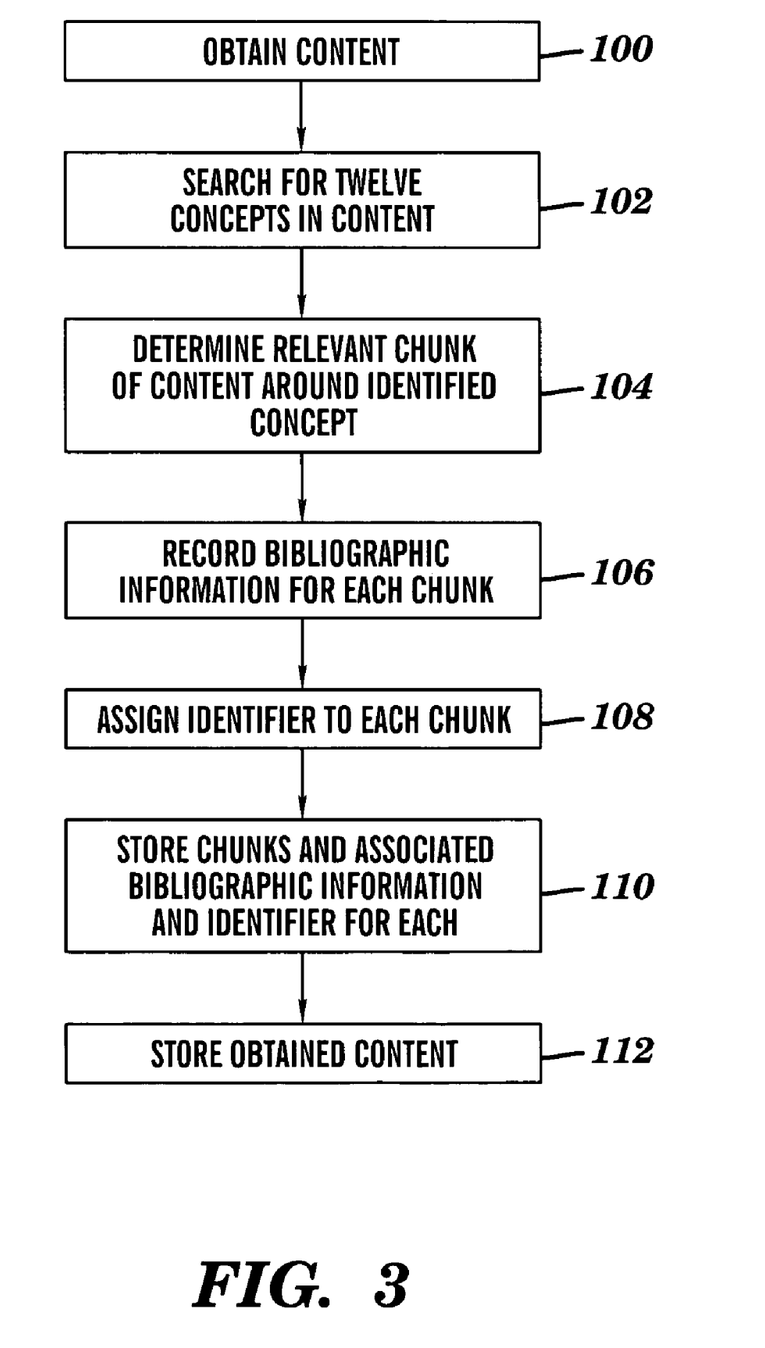
FIG. 3 is a flow chart of a method for sorting and storing content in accordance with embodiments of the present invention.

A method for obtaining, managing, and providing retrieved content in accordance with embodiments of the invention will now be described with reference to FIGS. 2-6. Referring more specifically to FIGS. 2-3, in step 100 the classification system 12 obtains content, such as word documents, PDFs, images, audio-visual materials, spreadsheets, power point slides, etc., from a variety of different static and/or dynamic sources. The classification system 12 can obtain the content in a variety of different manners, such as by receiving submissions of content from other operators, from searches by the classification system 12 for content, and/or by automated downloads from one or more sources of information. By way of example only, the classification system 12 could be coupled to a variety of on-line information providers, such as newspapers, business journals and technical journals, which continually feed new content to the classification system 12, although other arrangements for obtaining this information can be used.

In step 102, the classification system 12 searches the obtained content for anything which matches or relates to twelve concepts which are stored in memory 24 of classification system 12, although the classification system 12 can search for other numbers and types of concepts and could have other sets of concepts, such as a set of twelve concepts for business related information and another eight concepts for sports related information. For ease of discussion, system 10 will be described with reference to one set of twelve concepts, although again the particular number of concepts can vary as desired for the particular application.

With respect to each of these twelve concepts, the classification system 12 also has stored in memory 24 a plurality of related concepts or synonyms for each of the primary concepts and will search the obtained content for the related concepts as well, although the selected and related concepts can be obtained in other manners. For example, an operator using the user input device 28 for the classification system 12 can enter in different selected concepts and also related concepts to each of the selected concepts, although the classification system 12 can obtain the selected and related concepts in other manners. By way of example only, a selected concept might be financials and a related concept might be profit and loss so the classification system would search under the concept of financials for content matching or relating to financials and/or profit and loss. In another example, the classification system 12 may allow an operator to review the obtained content for the selected concepts and for related concepts using the display 26 and to use the user input device 28 to identify chunks of content that match a selected concept or a related concept as deemed appropriate by the operator. The classification system 12 can be self learning so that input from an operator on matches to selected concepts and/or other new related concepts can be added to the memory of the classification system 12 for future use in searching obtained content. For example, the operator may enter in a new related concept or synonym to a selected concept which is stored in memory 24 and used by classification system 12 in further classification of obtained content.

In step 104, when a selected or related concept is identified in the obtained content, then the classification system 12 determines what is a relevant chunk or portion of the content related to or matching the selected or related concept. A relevant chunk of content may be identified, even if only a related concept is found in the obtained content, but not the selected concept. As a result, the system 10 is more likely to obtain a wider cross section of content that is related to the search conducted by the operator. In these embodiments, the classification system 12 has a number stored in memory 24 which designates the number of words which occur before and after where a selected or related concept is identified to define the size of the determined relevant chunk in the obtained content, although other manners for determining the relevant chunk in the obtained content can be used. For example, an operator using the display 26 and user input device 28 can select the relevant chunk around the identified selected or related concept additionally the operator could reassign chunks to one or more other concepts. Again the classification system 12 can be self learning so that input from an operator on the determination of relevant chunks can be stored in memory and used by the classification system 12 in further determination of relevant chunks in new obtained content.

In step 106, the classification system 12 records the bibliographic information about the source for each of the determined chunks from information in the obtained content, although other manners for recording the bibliographic information can be used, such as allowing an operator using the user input device 28 to enter the bibliographic information. If the determined chunk is from an Internet source, then the bibliographic information includes a hypertext link back to the original content from which the chunk was obtained, although other types of bibliographic information can be stored with each chunk.

In step 108, the classification system assigns an identifier, such as a metatag, to each chunk of the obtained content which has been determined to be relevant, although other types of identifiers can be stored. The identifier for each chunk identifies the one or more concepts that each determined chunk is matched or related to so that the chunks can later be searched in memory 24 based on the selected concepts. The determined chunks can be related to more than one of the selected concepts.

In step 110, the chunks with the identifiers and bibliographic information are stored in memory 24 of the classification system 12, although the chunks can be stored in other locations. In step 112, the classification system 12 may also store the obtained content in memory 24, although the obtained content can be stored in other locations or left in its original location with links or other bibliographic information to retrieve the chunks or original content.

Figure 4:
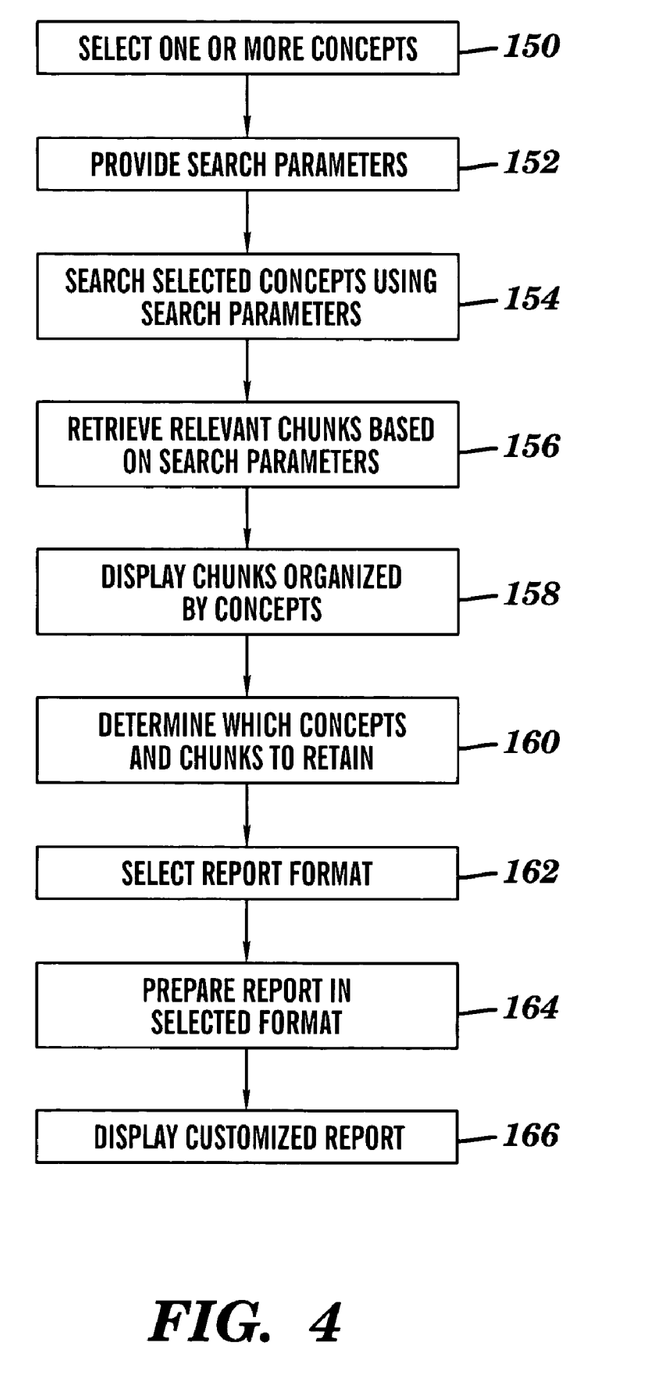
FIG. 4 is a flow chart of a method for retrieved chunks of content based on selected concepts and search parameters in accordance with embodiments of the present invention.
Figure 5:
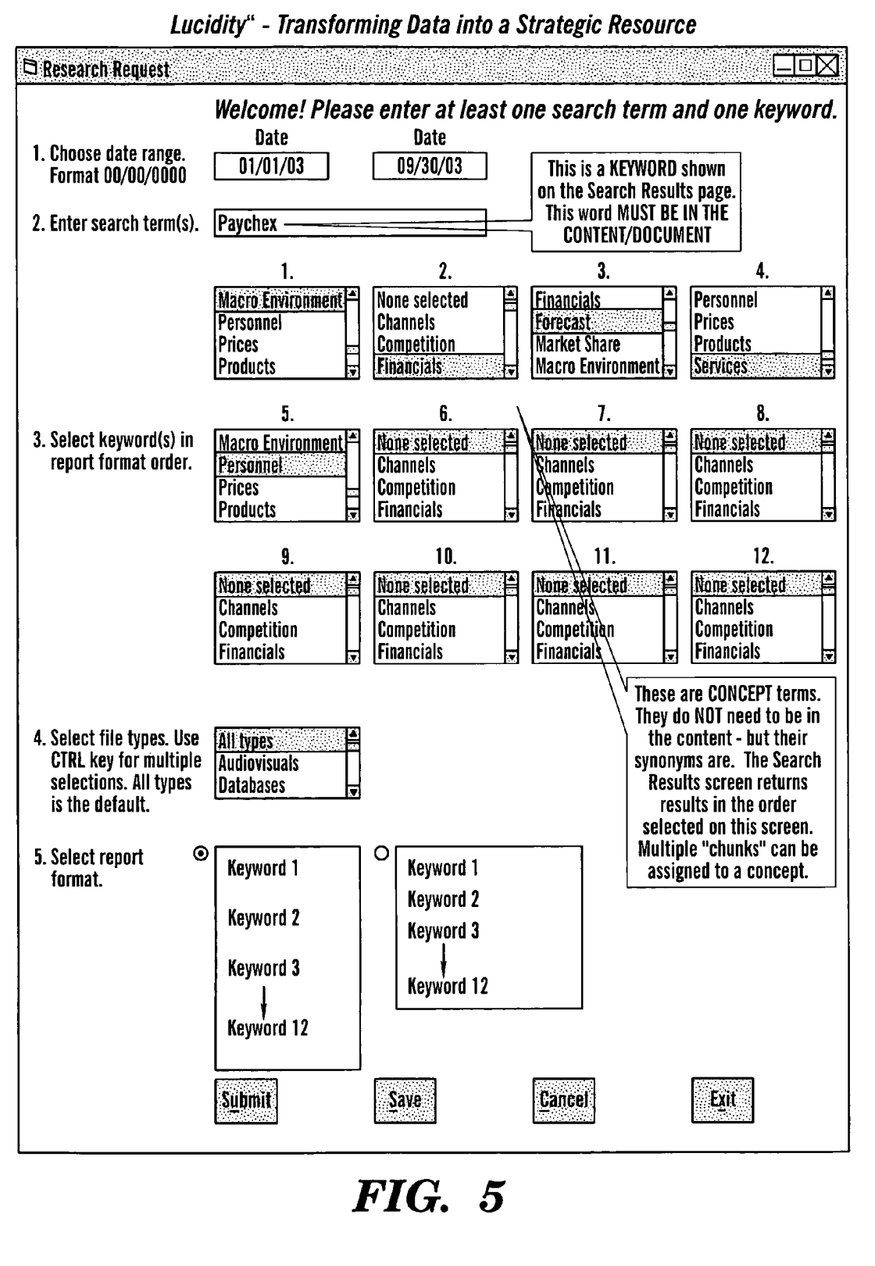
FIG. 5 is a screen shot of an entry screen for entering search and topic parameters.

Referring to FIGS. 2 and 4-6, in step 150 an operator or analyst at the user system 16 using the user input device 46 selects one or more concepts from a menu of twelve concepts, although other numbers and manners for selecting the concepts can be used. By way of example only, a screen shot that appears on display 48 which shows the options for selecting concepts is illustrated in FIG. 5. In this example, the operator using the user input device 46 can select concepts, such as personnel, prices, products, services, financials, forecasts, and market share, although other types of concepts can be used and selected. Additionally, the order in which the operator selects the concepts in the twelve numbered selection boxes in the screen shot shown in FIG. 5 is the same in which the search results are displayed under the selected concepts as headers. As a result, the operator can customize the display of the results of the search to provide the information to the operator in the most meaningful and easiest to synthesize manner. The operator does not need to select a concept in all twelve numbered selection boxes and other numbers and types of concepts can be used.

In step 152, the operator using the user input device 46 also enters in a date range and a search term, although other search parameters, such as other numbers of search terms, can be used. In the example illustrated in the screen shot shown in FIG. 5, the entered date range is from Jan. 1, 2003 to Sep. 30, 2003 and the search term is Paychex, although again other search parameters can be used.

In step 154, the user system 16 transmits the selected concepts and the search parameters to the content management system 14 which searches the chunks associated with each of the selected concepts that are stored in the memory 24 of the classification system 12 using the entered search parameter, although the search can be conducted in other manners. More specifically, in this example the content management system 14 uses the identifiers for each of the stored chunks in memory 24 in the classification system 12 to determine which chunks are associated with which concept, although other manners for associating the different chunks with the different concepts can be used. The content management system 14 then searches the chunks associated with each of the selected concepts using the search parameters and related parameters for each of the search parameters which are stored in and obtained from the memory 36 of the content management system 14, although other manners for searching the identified chunks can be used, such as allowing an operator using user system 16 to enter related parameters to an entered search term. For example, if the search term is "Paychex", then a related parameter might be the name of an officer of Paychex which would be used to search the chunks identified with each of the selected concepts.

In step 156, the content management system 14 retrieves the chunks which are related to or matched based on the search parameters from the memory 24 of the classification system 12 and transmits the retrieved chunks to the user system 16, although other manners for obtaining the relevant chunks can be used. In step 158, the user system 16 displays the chunks on display 48 under the appropriate selected concepts and organized in the order in which the concepts from the number boxes shown in FIG. 5, although the chunks can be displayed at other locations in other manners.

In step 160, the operator at the user system 16 reviews the retrieved chunks on the display 48 and using the user input device 46 can customize the appearance of the results of the search. By way of example only, the operator may eliminate one of the selected concepts and thus the associated chunks for that selected concept or the operator may rearrange the order of selected concepts.

In step 162, the operator at the user system 16 also can select the format in which the report of the search results will appear using the user input device 46. By way of example only, the reporting format selected by the operator might be in PowerPoint or as a word document, although other formats could be selected and combined together.

Figure 6:
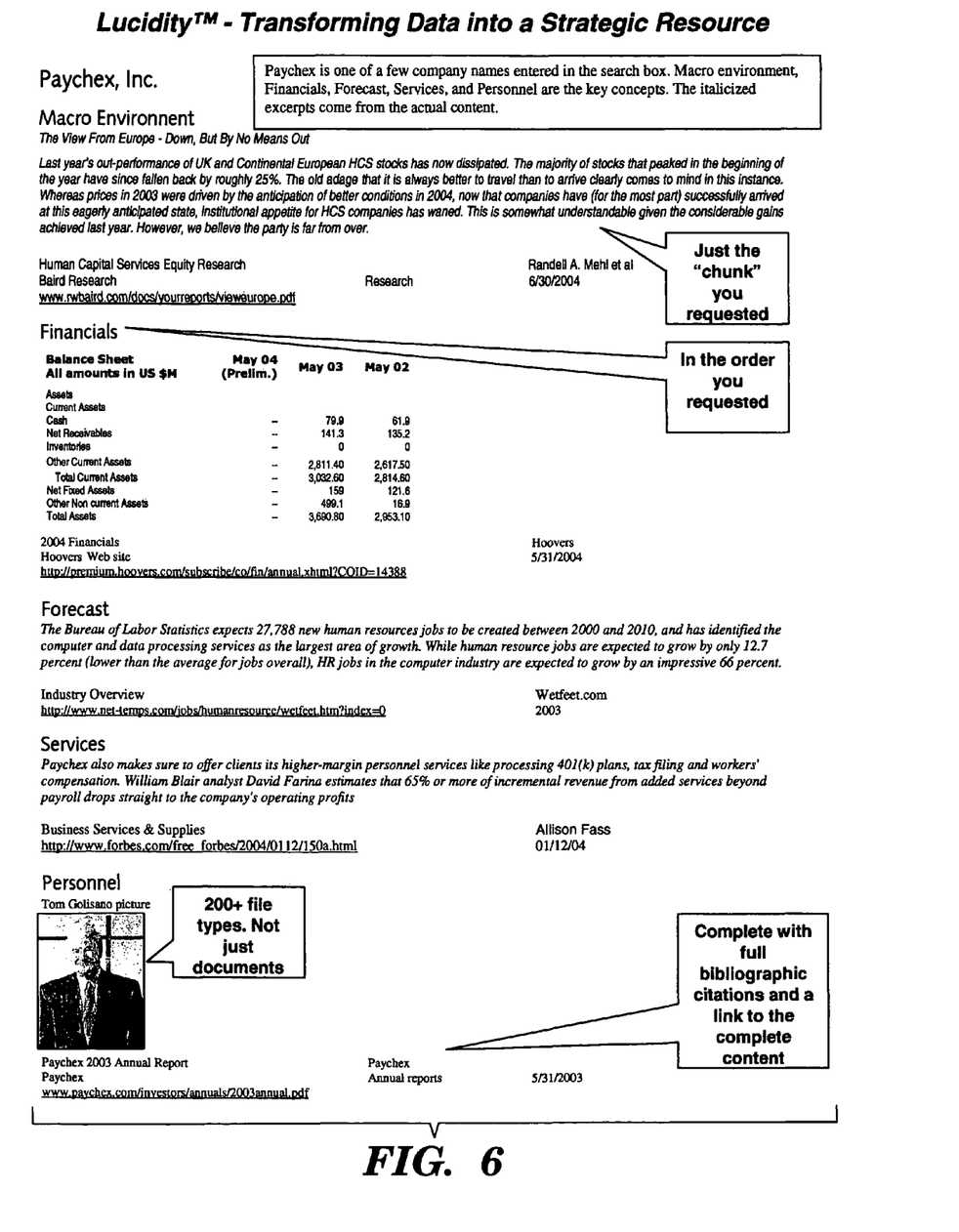
FIG. 6 is a screen shot of results of a customizable search in accordance with embodiments of the present invention.

In step 164, the user system 16 prepares the selected report format for the search results, although the preparation of the selected report can take place at other locations, such as by the content management system 14. In step 166, the user system 16 displays the customized report on display 48, although other manners for displaying the report can be used, such as printing out the report. By way of example only, a screen shot of a customized report on display 48 of user system 16 is illustrated in FIG. 6. The user system 16 also provides a number of additional options to the operator including options for the creation of a customizable auto-lookup and a transparent translation into language of choice by the user system 16. As the report shown in FIG. 6 illustrates the retrieved chunks are provided to the operator in a customized and easy to synthesize manner.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefore, is not intended to limit the claimed processes to any order except as may be explicitly specified in the claims. Accordingly, the invention is limited only by the following claims and equivalents thereto.

What is claimed is:

1. A computer based method for retrieving, processing, arranging and presenting searched data, comprising the steps of:

performing, using at least one specially-programmed general purpose computer, a search for textual content or an automatic download of textual content;

storing textual content, obtained from the search or automatically downloaded, in a memory of at least one specially-programmed general purpose computer;

storing, separate from the textual content, a plurality of concepts in the memory wherein it is not known if there are matches in the textual content with the plurality of concepts;

storing, for each concept from the plurality of concepts and separate from the previously obtained textual content, at least one respective related concept in the memory, where each at least one respective related concept is synonymous with said each concept from the plurality of concepts wherein it is not known if there are matches in the textual content with the at least one respective related concept;

searching, using a processor in the at least one specially-programmed general purpose computer, the textual content to identify at least one respective match, in the textual content, with a related concept for a first concept from the plurality of concepts, wherein there is no match in the textual content for the first concept;

creating, using the processor, a plurality of chunks of data from the textual content, wherein each chunk of data from the plurality of chunks of data includes at least one said at least respective match and wherein each chunk of data is a respective portion of the textual content;

storing the plurality of chunks of data in the memory;

receiving an input, using the processor, selecting at least one concept from the plurality of concepts;

storing, in the memory, the at least one selected concept from the plurality of concepts;

receiving an input, using the processor, selecting at least one search parameter;

storing at least one selected search parameter in the memory;

identifying, using the processor, at least one desired chunk of data from the plurality of chunks of data, the at least one desired chunk of data including the at least one selected concept and the at least one selected search parameter; and, presenting, using the general-purpose computer, the at least one desired chunk of data;

wherein creating a plurality of chunks of data includes creating a chunk of data from the plurality of chunks of data matched with at least two concepts from the plurality of concepts.

2. The method of claim 1 further comprising:

generating, using the processor, at least one respective identifier for each chunk of data in the plurality of chunks of data, wherein the identifier is with respect to a concept from the plurality of concepts included in the at least one respective match; and, storing the at least one respective identifier in the memory.

3. The method of claim 2 wherein identifying, using the processor, at least one desired chunk of data from the plurality of chunks of data includes identifying, using the processor, at least one desired chunk of data from the plurality of chunks of data based upon the at least one respective identifier.

4. The method of claim 1 further comprising storing at least one selected metric in the memory and wherein creating a plurality of chunks of data includes determining a respective extent for at least one chunk of data in the plurality of chunks of data according to the selected metric.

5. The method of claim 4 wherein the selected metric is a number of words before or after at least one match from the at least one respective match.

6. The method of claim 1 wherein storing at least one selected concept includes storing the at least one selected concept in a predetermined order and wherein presenting the at least one desired chunk of data includes presenting the at least one desired chunk of data according to the predetermined order.

7. The method of claim 1 wherein the at least one selected search parameter is a search term or a date.

8. A computer based system for retrieving, processing, arranging and presenting searched data, comprising:
   a processor for at least one specially-programmed computer for:
   performing a search for textual content or an automatic download of textual content;
   storing textual content, obtained from the search or automatically downloaded, in a memory of at least one specially-programmed general purpose computer;
   storing a plurality of concepts in the memory, the plurality of concepts separate from the textual content wherein it is not known if there are matches in the textual content with the plurality of concepts;
   storing, for each concept from the plurality of concepts, at least one respective related concept in the memory, where each at least one respective related concept is synonymous with said each concept from the plurality of concepts, where the plurality of related concepts is separate from the previously obtained textual content and wherein it is not known if there are matches in the textual content with the at least one respective related concept;
   searching the textual content to identify at least one respective match, in the textual content, with a respective related concept for a first concept from the plurality of concepts, wherein there is no match in the textual content for the first concept;
   creating a plurality of chunks of data from the textual content, wherein each chunk of data from the plurality of chunks of data includes at least one said at least one respective match and wherein each chunk of data is a respective portion of the textual content;
   storing the plurality of chunks of data in the memory;
   receiving an input selecting at least one concept from the plurality of concepts;
   storing, in the memory, the at least one selected concept from the plurality of concepts;
   receiving an input selecting at least one search parameter;
   storing at least one selected search parameter in the memory;
   identifying at least one desired chunk of data from the plurality of chunks of data, the at least one desired chunk of data including the at least one selected concept and the at least one selected search parameter; and
   presenting, using the general-purpose computer, the at least one desired chunk of data;
   wherein creating a plurality of chunks of data includes creating a chunk of data from the plurality of chunks of data matched with at least two concepts from the plurality of concepts.

9. The system of claim 8 wherein the processor is for:
   generating at least one respective identifier for each chunk of data in the plurality of chunks of data, wherein the identifier is with respect to a concept from the plurality of concepts included in the at least one respective match; and,
   storing the at least one respective identifier in the memory.

10. The system of claim 9 wherein the processor is for identifying at least one desired chunk of data from the plurality of chunks of data based upon the at least one respective identifier.

11. The system of claim 8 wherein the processor is for:
storing at least one selected metric in the memory and wherein the processor is for determining a respective extent for at least one chunk of data in the plurality of chunks of data according to the selected metric.

12. The system of claim 11 wherein the selected metric is a number of words before or after at least one match from the at least one respective match.

13. The system of claim 8 wherein the processor is for storing the at least one selected concept in a predetermined order and wherein the processor is for presenting the at least one desired chunk of data according to the predetermined order.

14. The system of claim 8 wherein the at least one selected search parameter is a search term or a date.

15. A computer based method for retrieving, processing, arranging and presenting searched content, comprising the steps of:
   storing a plurality of concepts in a memory of at least one specially-programmed general purpose computer;
   for at least one concept from the plurality of concepts, storing at least one related concept, different from the at least one concept, in the memory;
   storing previously obtained content in the memory, the content selected from the group consisting of textual content, image content, and audio-visual content wherein the previously obtained content is separate from the plurality of concepts and the at least one related concept for said each concept and wherein it is not known if there are respective matches in the previously obtained textual content with the plurality of concepts or with the at least one related concept;
   searching, using a processor in the at least one specially-programmed general purpose computer, the previously obtained content to identify at least one first match, in the previously obtained content, with a concept from the plurality of concepts or with a related concept from the at least one related concept;
   creating, using the processor, at least one chunk of content from the previously obtained content, wherein each chunk of content from the at least one chunk of content includes a first match from the at least one first match and wherein a chunk in the at least one chunk of content includes respective pre-determined numbers of words before and after the first match;
   storing the at least one chunk of content in the memory;
   storing, in the memory, at least one selected concept from the plurality of concepts, wherein when the at least one selected concept includes a plurality of selected concepts, the selected concepts in the plurality of concepts are arranged in a selected order;
   storing at least one selected search parameter in the memory;
   searching, using the processor, the at least one chunk of content to identify at least one second match, in the at least one chunk of content, with the at least one selected concept and with the at least one selected search parameter;
   creating, using the processor, at least one chunk of matched content from the at least one chunk of content, the at least one chunk of matched content including the at least one second match;

presenting, using the general-purpose computer, a respective section for each selected concept in the at least one selected concept, wherein when the at least one selected concept includes the plurality of selected concepts, the selected concepts in the plurality of concepts are presented in the selected order; and, presenting, using the general-purpose computer, the at least one matched chunk of content, wherein the at least one matched chunk of content is included in the respective section for the at least one selected concept.

16. A computer based system for retrieving, processing, arranging and presenting searched content, comprising a processor for at least one specially programmed for:

storing a plurality of concepts in a memory of the at least one specially-programmed general purpose computer;

for at least one concept from the plurality of concepts, storing at least one related concept, different from the at least one concept, in the memory;

storing previously obtained content in the memory, the content selected from the group consisting of textual content, image content, and audio-visual content, wherein the previously obtained content is separate from the plurality of concepts and the at least one related concept for said each concept and wherein it is not known if there are respective matches in the previously obtained textual content with the plurality of concepts or the at least one related concept;

searching the previously obtained content to identify at least one first match, in the previously obtained content, with a concept from the plurality of concepts or with a related concept from the at least one related concept;

creating at least one chunk of content from the previously obtained content, wherein each chunk of content from the at least one chunk of content includes a first match from the at least one first match, and wherein a chunk in the at least one chunk of content includes respective pre-determined numbers of words before and after the first match;

storing the at least one chunk of content in the memory;

storing, in the memory, at least one selected concept from the plurality of concepts, wherein when the at least one selected concept includes a plurality of selected concepts, the selected concepts in the plurality of concepts are arranged in a selected order;

storing at least one selected search parameter in the memory;

searching the at least one chunk of content to identify at least one second match, in the at least one chunk of content, with the at least one selected concept and with the at least one selected search parameter;

creating at least one chunk of matched content from the at least one chunk of content, the at least one chunk of matched content including the at least one second match;

presenting a respective section for each selected concept in the at least one selected concept, wherein when the at least one selected concept includes the plurality of selected concepts, the selected concepts in the plurality of concepts are presented in the selected order; and, presenting the at least one matched chunk of content, wherein the at least one matched chunk of content is included in the respective section for the at least one selected concept.

* * * * *

UNITED STATES PATENT AND TRADEMARK OFFICE
CERTIFICATE OF CORRECTION

| | | |
|---|---|---|
| PATENT NO. | : 7,827,164 B2 | Page 1 of 1 |
| APPLICATION NO. | : 10/988342 | |
| DATED | : November 2, 2010 | |
| INVENTOR(S) | : Linda M. Stevenson | |

It is certified that error appears in the above-identified patent and that said Letters Patent is hereby corrected as shown below:

Col. 9, lines 15 through 17 should appear as follows:

storing textual content, obtained from the search or automatically downloaded, in a memory of --the-- at least one specially-programmed general purpose computer;

Col. 11, lines 11 through 13 should appear as follows:

16. A computer based system for retrieving, processing, arranging and presenting searched content, comprising a processor for at least one specially programmed --general purpose computer-- for:

Signed and Sealed this
First Day of February, 2011

David J. Kappos
*Director of the United States Patent and Trademark Office*